(12) United States Patent
Williams (10) Patent No.: US 8,310,800 B1
(45) Date of Patent: Nov. 13, 2012

(54) FAULT DETECTOR FOR SURGE SUPPRESSOR

(75) Inventor: Thomas S. Williams, Clearwater, FL (US)

(73) Assignee: Technology Research Corporation, Clearwater, FL (US)

( * ) Notice: Subject to any disclaimer, the term of this patent is extended or adjusted under 35 U.S.C. 154(b) by 391 days.

(21) Appl. No.: 12/661,717

(22) Filed: Mar. 23, 2010

Related U.S. Application Data (60) Provisional application No. 61/211,038, filed on Mar. 24, 2009.

(51) Int. Cl.
*H02H 1/00* (2006.01)
*H02H 1/04* (2006.01)

(52) U.S. Cl. ............................ 361/131; 361/117; 361/21

(58) Field of Classification Search .................. 361/131, 361/117; 338/21
See application file for complete search history.

(56) References Cited

U.S. PATENT DOCUMENTS

| | | | |
|---|---|---|---|
| 4,068,281 A * | 1/1978 | Harnden, Jr. ................... | 361/106 |
| 6,535,369 B1 * | 3/2003 | Redding et al. ................ | 361/111 |
| 7,483,252 B2 * | 1/2009 | de Palma et al. ............... | 361/127 |
| 7,505,241 B2 * | 3/2009 | McLoughlin et al. ......... | 361/124 |
| 2007/0217111 A1 * | 9/2007 | Tseng ............................ | 361/118 |
| 2008/0088405 A1 * | 4/2008 | Xu .................................. | 338/21 |
| 2008/0129440 A1 * | 6/2008 | Ho ................................... | 337/5 |

* cited by examiner

*Primary Examiner* — Rexford Barnie
*Assistant Examiner* — Scott Bauer
(74) *Attorney, Agent, or Firm* — Frijouf, Rust & Pyle P.A.

(57) ABSTRACT

A fault sensor is disclosed for detecting the failure of a surge suppression device such as a metal oxide varister (MOV). The fault sensor comprises a fault sensor conductive layer overlaying an insulated portion of the surge suppression device. A fault sensor connector is connected to the fault sensor conductive layer for conducting a fault current upon a failure of the insulated portion of the surge suppression device.

20 Claims, 7 Drawing Sheets

FAULT DETECTOR FOR SURGE SUPPRESSOR

CROSS-REFERENCE TO RELATED APPLICATIONS

This application claims benefit of U.S. Patent Provisional application No. 61/211,038 filed Mar. 24, 2009. All subject matter set forth in provisional application 61/211,038 filed Mar. 24, 2009 is hereby incorporated by reference into the present application as if fully set forth herein.

BACKGROUND OF THE INVENTION

1. Field of the Invention

This invention relates to surge suppression devices and more particularly to a fault sensor for detecting the failure of the surge suppression device.

2. Description of the Related Art

Varistors are widely used in many electronic circuits for protecting the electronic circuit against excessive transient voltages. The varistor protects the electronic circuit by shunting current created by excessive transient voltages away from sensitive components of the electronic circuit.

A varistors utilizes a surge suppression material interposed between plural metallic plates. An insulator overlies the surge suppression material as well as the plural metallic plates. A first and a second electrode extend into the insulator for connection to the plural metallic plates. The first and second electrodes are connected within an electronic circuit for providing protection against excessive transient voltages.

One of the most common varistors use in electronic circuit is the metal oxide varistor. The metal oxide varistor utilizes a mass of zinc oxide grains in a matrix of other metal oxides to form the surge suppression material. Each grain of the zinc oxide forms a diode junction with an adjacent grain which permits current to flow only in one direction. The multiplicity of randomly oriented diode junctions forms a surge suppression material. The surge suppression material is matrix of back-to-back diode pairs with each pair of diodes being in parallel with many other pairs of diodes.

When a small a moderate voltage is applied across the first and second electrodes, only a small reverse leakage current flows through the multiplicity of diode junctions. When a large voltage is applied across the first and second electrodes, the diode junctions break down because of the avalanche effect in a large current flow. The metal oxide varistor has highly non-linear voltage-current characteristic in which the metal oxide varistor has a high resistance at low applied voltage and a low resistance at applied high-voltage.

Although the metal oxide varistor has found widespread use and success in protecting electronic circuits, the metal oxide varistor suffers from certain deficiencies. If the transient voltage is higher than the design criteria of the metal oxide varistor, metal oxide varistor may melt, burn, vaporize or be totally destroyed. Nearby lightning strikes may cause such damage to a metal oxide varistor.

When the metal oxide varistor is melted, burned, vaporized or otherwise be damaged, the metal oxide varistor can cause a fire within the equipment or products the metal oxide resistors are intended to protect. A fire within the equipment or products may spread to nearby or adjacent areas possibly causing injury and/or damage to persons and property.

Typically, the melting, burning, vaporization of a metal oxide varistor produces conductive plasma. The conductive plasma provides an opportunity to detect damage or total destruction of the metal oxide varistor in real-time.

Therefore, it is a primary object of the present invention to provide a fault sensor for detecting the failure of a surge suppression device such as a metal oxide varistor.

Another object of the invention is to provide a fault sensor for detecting the failure of a surge suppression device that may be connected to disconnect circuits or circuit breakers.

Another object of the invention is to provide a fault sensor for detecting the failure of a surge suppression device that may be retrofitted into existing surge suppression devices.

Another object of the invention is to provide a fault sensor for detecting the failure of a surge suppression device that may be incorporated within the manufacture of the surge suppression device.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to a fault detector sensor for detecting the failure of a surge suppression device. The surge suppression device comprises a surge suppression material interposed between a first and a second surge suppression electrode and surrounded by a surge suppression insulating material. Inner portion of a first and a second surge suppression connector are in contact with the first and second surge suppression electrodes. Outer portions of the first and second surge suppression connectors extend outwardly from the surge suppression insulating material. The fault sensor circuit comprises a fault sensor conductive layer overlaying at least a portion of the surge suppression insulating material of the surge suppression device. A fault sensor connector is connected to the fault sensor conductive layer for conducting a fault current in the fault sensor connector upon a failure in the surge suppression device.

In a more specific example, the surge suppression device comprises a metal oxide varister (MOV). The fault sensor conductive layer comprises a metallic layer overlaying at least a portion of the surge suppression insulating material of the surge suppression device. The fault sensor conductive layer comprises a metallized layer such as a metallic foil.

In a further specific example, the surge suppression device defines a first and a second side. The fault sensor conductive layer comprises a first and a second foil overlying at least a portion of the first and second sides of the surge suppression device. The fault sensor conductive layer comprises a metallic foil affixed to at least a portion of the surge suppression device with an adhesive.

In another specific example of the invention, the fault sensor connector comprises a metallic wire engaging with the fault sensor conductive layer. A metallic wire underlies the conductive layer. In a more specific example, the surge suppression device defines a first and a second side. The fault sensor conductive layer comprises a first and a second fault sensor conductive layer overlaying the first and the second side of the surge suppression device. The fault sensor connector includes a metallic wire contacting the first and second fault sensor conductive layers.

An outer insulator overlays the fault sensor conductive layer as well as overlaying an inner portion of the fault sensor connector. The outer portion of the fault sensor connector extends outwardly from the outer insulator. In a more specific example, the surge suppression device defines a first and a second side. The fault sensor conductive layer comprises a first and a second fault sensor conductive layer overlying at least a portion of the first and second sides of the surge suppression device. An outer insulator is located adjacent to the first and second sides of the surge suppression device for overlaying the first and second fault sensor conductive layers and for overlaying an inner portion of the fault sensor connector with an outer portion of the fault sensor connector extending outwardly from the outer insulator.

A disconnect circuit is connected to the fault sensor connector for disconnecting electrical power to the surge suppression device upon the detection of a current in the fault sensor connector.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

FIGS. 1-5 are various views of a first embodiment of a fault detector sensor 10 for detecting the failure of a surge suppression device 12. The fault detector sensor 10 shown in FIGS. 1-5 illustrates the addition of the fault detector sensor 10 to a surge suppression device 12 of the prior art such as a shown as a metal oxide varistor (MOV). The fault detector sensor 10 is designed to operate in concert with a disconnect circuit shown in FIGS. 12-18 for disconnecting electrical power to the surge suppression device 12 upon the detection of a failure of the surge suppression device 12.

Figure 1:
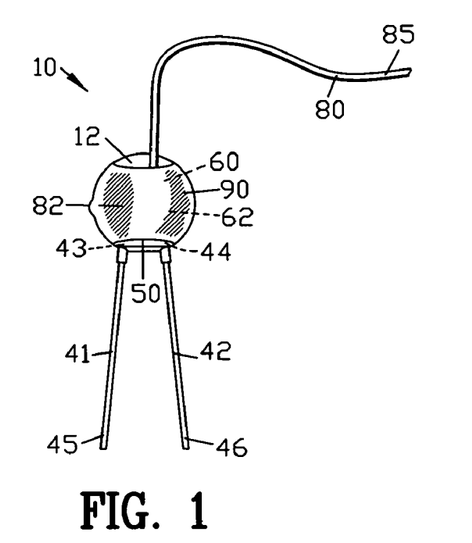
FIG. 1 is a front view of a first embodiment of a fault sensor for to a surge suppression device shown as a metal oxide varister (MOV)
Figure 2:
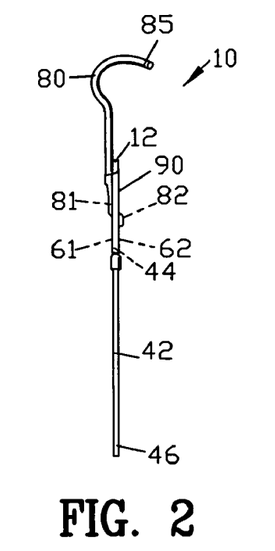
FIG. 2 is a side view of FIG. 1.
Figure 3:
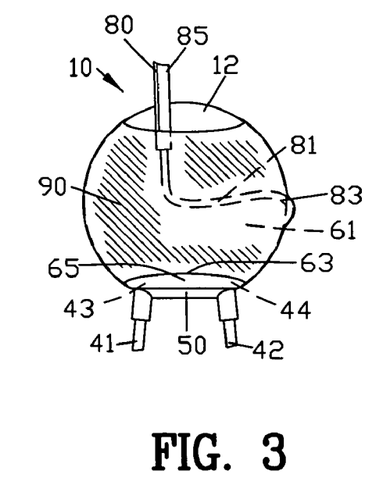
FIG. 3 is a magnified view of a portion of FIG. 1.
Figure 4:
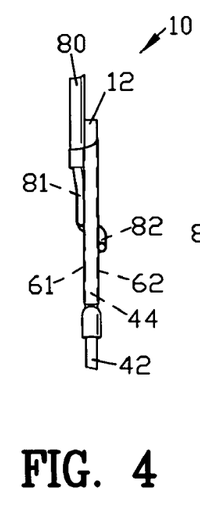
FIG. 4 is a side view of FIG. 3.
Figure 5:
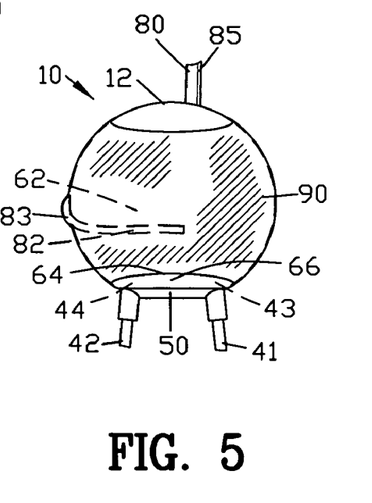
FIG. 5 is a rear view of FIG. 3.
Figure 6:
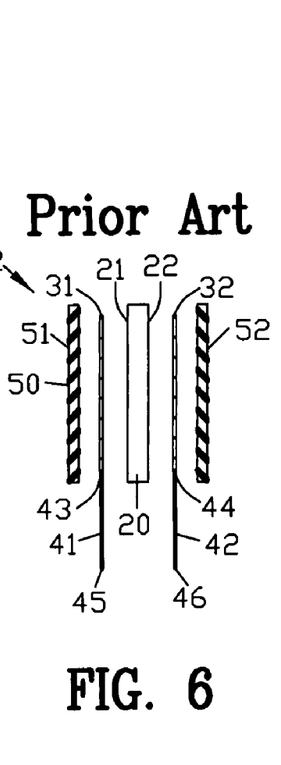
FIG. 6 is an exploded view of a metal oxide varister (MOV) of the prior art.

FIG. 6 is an enlarged sectional exploded view of a surge suppression device 12 of the prior art. The surge suppression device 12 comprises a surge suppression material 20 having a first side 21 and a second side 22. A first and a second surge suppression electrode 31 and 32 are located on the first and second sides 21 and 22 of the surge suppression material 20.

A first and a second surge suppression connector 41 and 42 are in contact with the first and second surge suppression electrodes 31 and 32. Inner portions 43 and 44 of the first and second surge suppressions connectors 41 and 42 are in contact with the first and second surge suppression electrodes 31 and 32.

The surge suppression material 20, the first and second surge suppression electrodes 31 and 32 and the inner portions 43 and 44 of the first and second surge suppression connectors 41 and 42 are surrounded by a surge suppression insulating material 50. The surge suppression insulating material 50 defines a first side and a second side 51 and 52 adjacent to the first and second sides 21 and 22 of the surge suppression material 20.

Outer portions 45 and 46 of the first and second surge suppression connectors 41 and 42 extend outwardly from the surge suppression insulating material 50 for connection to an external circuit as shown in FIGS. 12-18.

Figure 7:
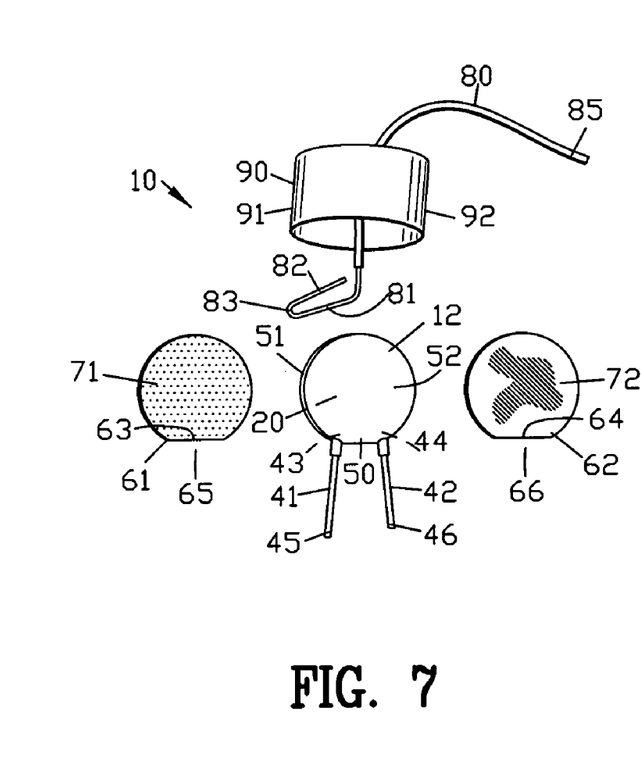
FIG. 7 is an exploded view of the first embodiment of the fault sensor shown in FIGS. 1-5.
Figure 8:
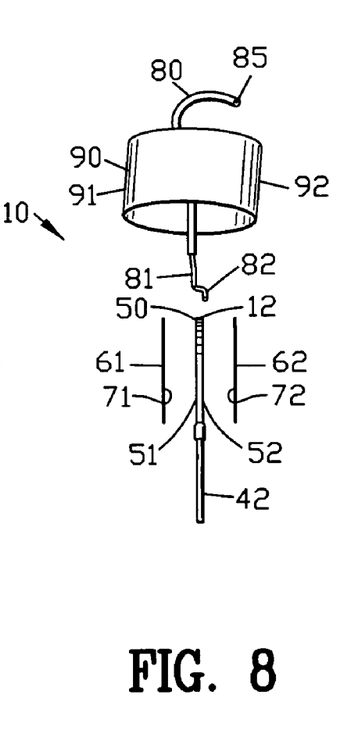
FIG. 8 is a side view of FIG. 7.

FIGS. 7 and 8 are exploded views of the first embodiment of the fault detector sensor 10 illustrating the process of making the fault detector sensor 10 for detecting the failure of a surge suppression device 12 shown in FIGS. 1-5. The surge suppression device 12 is representative of a prior art metal oxide varistor (MOV).

The fault detector sensor 10 shown in FIGS. 1-5 and 7-8 comprises a fault sensor conductive layer 60 an adhesive 70, a fault sensor wire 80 and an outer insulator 90. The fault sensor conductive layer 60 overlays at least a portion of the surge suppression insulating material 50 of the surge suppression device 12.

The fault sensor conductive layer 60 may comprises a metal layer such as a metallic coating or a metallic paint overlaying a portion of the surge suppression insulating material 50. In the alternative, the fault sensor conductive layer 60 may comprises a metallic foil such as copper or aluminum foil overlaying a portion of the surge suppression insulating material 50 of the surge suppression device 12. Optionally, the conductive layer 60 in the form of a metallic foil may be affixed to the surge suppression insulating material 50 by the adhesive 70.

In this example, the fault sensor conductive layer 60 comprises a first and a second metallic foil 61 and 62 overlying portions of the first and second sides 51 and 52 of the surge suppression insulating material 50 of the surge suppression device 12. The first and second metallic foils 61 and 62 are affixed to the first and second sides 51 and 52 of the surge suppression insulating material 50 by adhesives 71 and 72.

Preferably, each of the first and second metallic foils 61 and 62 are generally circular with chords 63 and 64 defining a void segment 65 and 66. The void segment 65 and 66 provides a generally D-shaped first and second metallic foil 61 and 62. The void segments 65 and 66 space the each of the first and second metallic foils 61 and 62 from the exposed portions of the first and second surge suppressions connectors 41 and 42. The void segments 65 and 66 space the each of the first and second metallic foils 61 and 62 from the exposed portions of the first and second surge suppressions connectors 41 and 42 by a suitable distance such as 0.125 inches.

The fault detector sensor 10 comprises a fault sensor wire 80 engaging with the fault sensor conductive layer 60. The fault sensor connector is shown as a fault sensor wire 80 engaging with the fault sensor conductive layer 60. In this embodiment, the fault sensor wire 80 comprises a first and a second inner wire portion 81 and 82 connected by a wire bend 83. The fault sensor wire 80 has an outer wire portion 85 for connection to an external circuit as shown in FIGS. 12-18.

The first and a second inner wire portion 81 and 82 may underlay the first and second metallic foil 61 and 62 or may overlay the first and second metallic foil 61 and 62. Preferably, the fault sensor wire 80 is wrapped about the surge suppression device 12 with the first and second inner wire portions 81 and 82 adjacent to the first and second sides 51 and 52 of the surge suppression insulating material 50 of the surge suppression device 12. The first and second inner wire portions 81 and 82 of the fault sensor wire 80 are located between the first and second sides 51 and 52 of the surge suppression insulating material 50 and the first and second metallic foils 61 and 62.

The first and second wire portions 81 and 82 are connected to the first and second metallic foils 61 and 62. The first and second wire portions 81 and 82 may be connected to the first and second metallic foils 61 and 62 by a mechanical connection, a pressure connection, soldering connection, welding connection and the like. In this embodiment, the first and second metallic foils 61 and 62 are affixed to the first and second sides 51 and 52 of the surge suppression insulating material 50 by the adhesives 71 and 72. The affixing of the first and second metallic foils 61 and 62 to the first and second sides 51 and 52 of the surge suppression insulating material 50 provides a mechanical engagement between the first and second metallic foils 61 and 62 and the first and second inner wire portions 81 and 82 of the fault sensor wire 80 to establish an electrical connection therebetween. The outer wire portion 85 extends outwardly for connection to an external circuit as shown in FIGS. 16-20.

An outer insulator 90 overlays the fault sensor conductive layer 60 and overlays the first and second inner wire portions 81 and 82 of the fault sensor wire 80. The outer insulator 90 includes a first and a second outer insulator portion 91 and 92 overlaying the first and second metallic foils 61 and 62. Preferably, the outer insulator 90 provides an inward pressure or force for urging the first and second metallic foils 61 and 62 into electrical contact with the first and second inner wire portions 81 and 82 of the fault sensor wire 80.

In this example, the outer insulator 90 is shown as a heat shrinkable insulating material commonly referred to as shrink-wrap tubing. In one example, a 0.5 inch length of Raychem 5058764004 shrink wrap tubing is used for the outer insulator 90. The outer insulator 90 provides insulation for the first and second metallic foils 61 and 62 as well as insulation for the first and second inner wire portions 81 and 82 of the fault sensor wire 80. In addition, the outer insulator 90 in the form of a shrink wrap tubing provides an inward pressure or force for urging the first and second metallic foils 61 and 62 into to electrical contact with the first and second inner wire portions 81 and 82 of the fault sensor wire 80.

In many prior art safety devices, the prior art safety devices only open the power source within the equipment being protected. This type of prior art safety device is unsatisfactory since an explosive plasma sometimes creates additional short circuits within the equipment by-passing conventional fail-safe components such as fuse links, thermo-switches and the like. The by-passing of the conventional fail-safe components may result in additional burning of other live components and further burning external of the equipment being protected.

The fault sensor 10 of the present inventions detects the conductive plasma out gassing from the metal oxide varistor MOV. The out gassing of conductive plasma from the metal oxide varistor MOV indicated an imminent failure of the metal oxide varistor MOV. The fault sensor 10 detects the imminent failure of the metal oxide varistor MOV and provides a signal to open a disconnect circuit to remove power from the metal oxide varistor MOV.

Figures 9, 10, 11:
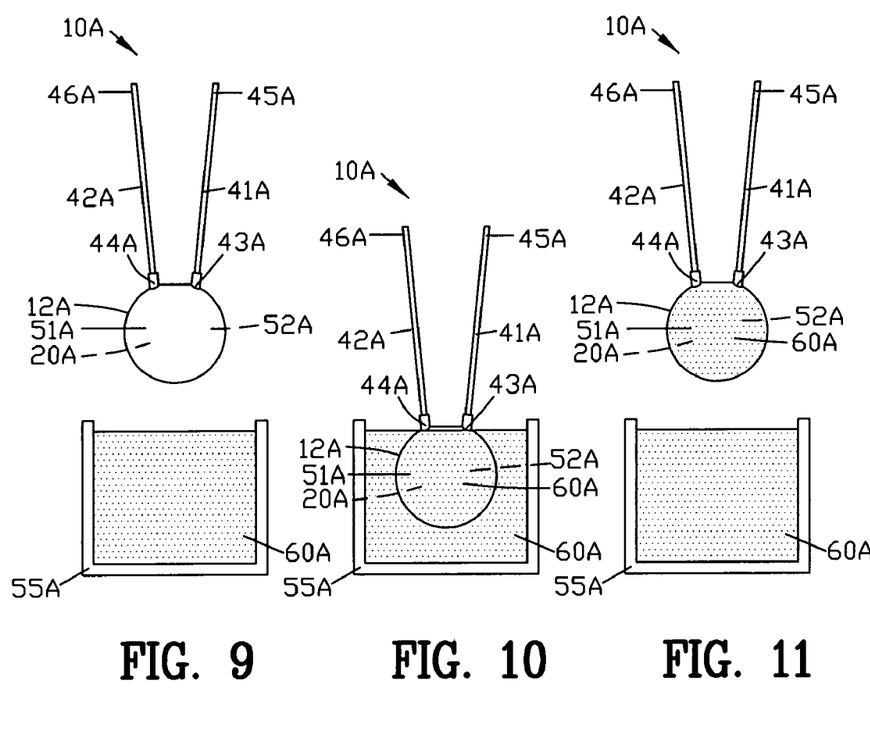
FIG. 9 is a first step of a method of making a second embodiment of the fault sensor of the present invention illustrating positioning a surge suppression device over a container of a liquid conductive material.
FIG. 10 is a second step of the method of making a second embodiment of the fault sensor of the present invention illustrating the immersion of the surge suppression device within the container of a liquid conductive material.
FIG. 11 is a third step of the method of making a second embodiment of the fault sensor of the present invention illustrating the removal of the surge suppression device from the container of a liquid conductive material.

FIG. 9 is a first step of a method of making a second embodiment of the fault sensor 10A of the present invention illustrating positioning a prior art surge suppression device 12A over a container 55A of a liquid conductive material 60A. Although various materials may be used for the liquid conductive material 60A, a carbon-based shielding paint is suitable for use in the present invention. One example of a carbon based shielding paint is the carbon-based HF shielding paint HSF-54 sold under the trademark YSHIELD (www.yshield.com).

FIG. 10 is a second step of the method of making the second embodiment of the fault sensor 10A of the present invention illustrating the immersion of the prior art surge suppression device 12A within the container 55A of a liquid conductive material 60A.

FIG. 11 is a third step of the method of making a second embodiment of the fault sensor 10A of the present invention illustrating the removal of the prior art surge suppression device 12A from the container 55A of a liquid conductive material 60A. The liquid conductive material 60A cures and/or dries onto the first and second surfaces 51A and 52A of the prior art surge suppression device 12A.

Figure 12:
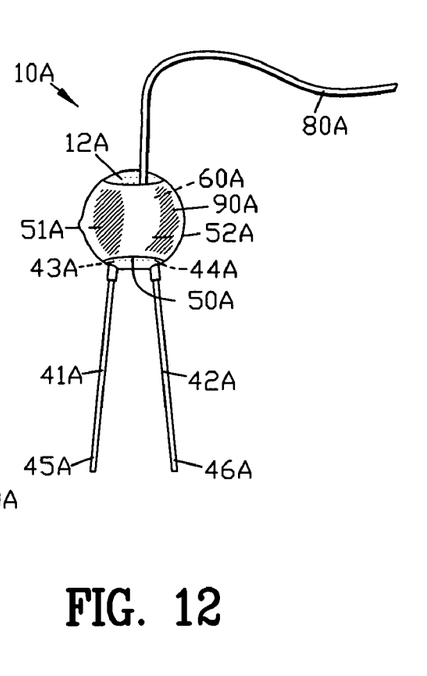
FIG. 12 is a fourth step of the method of making a second embodiment of the fault sensor of the present invention illustrating the addition of a fault detection electrode and an outer insulator to the surge suppression device.

FIG. 12 is a fourth step of the method of making a second embodiment of the fault sensor 10A of the present invention illustrating the addition of a fault detection electrode 80A and an outer insulator 90A to the surge suppression device 12A. The fault detection electrode 80A and the outer insulator 90A may be added to the surge suppression device 12A in a manner as set forth in FIGS. 1-8.

Figure 13:
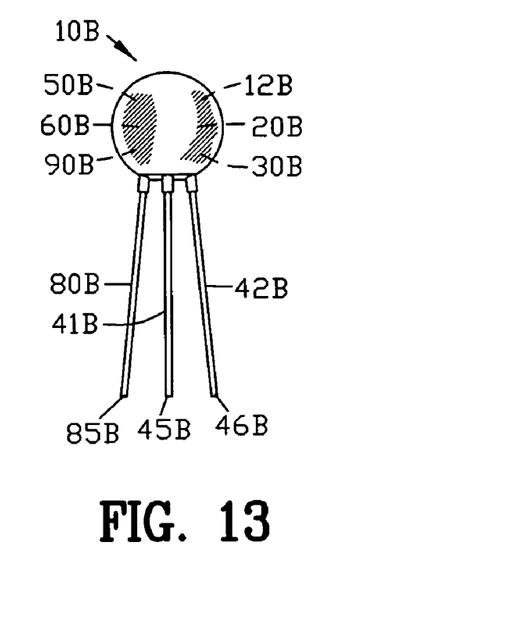
FIG. 13 is a front view of a third embodiment of a fault sensor for to a surge suppression device shown as a metal oxide varister (MOV)
Figure 14:
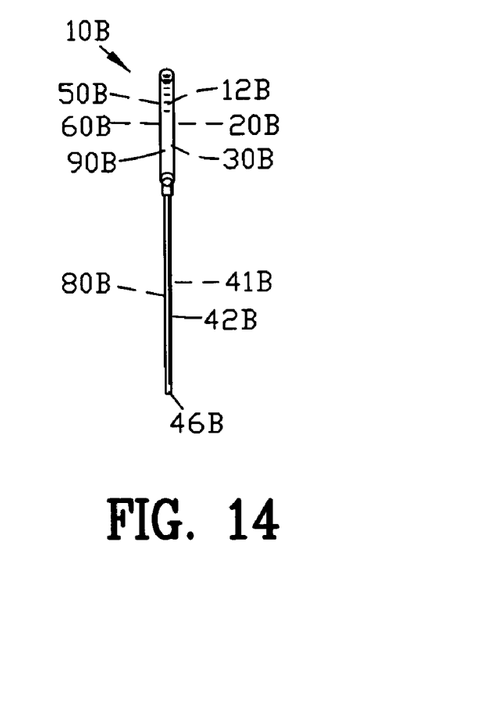
FIG. 14 is a side view of FIG. 13.
Figure 15:
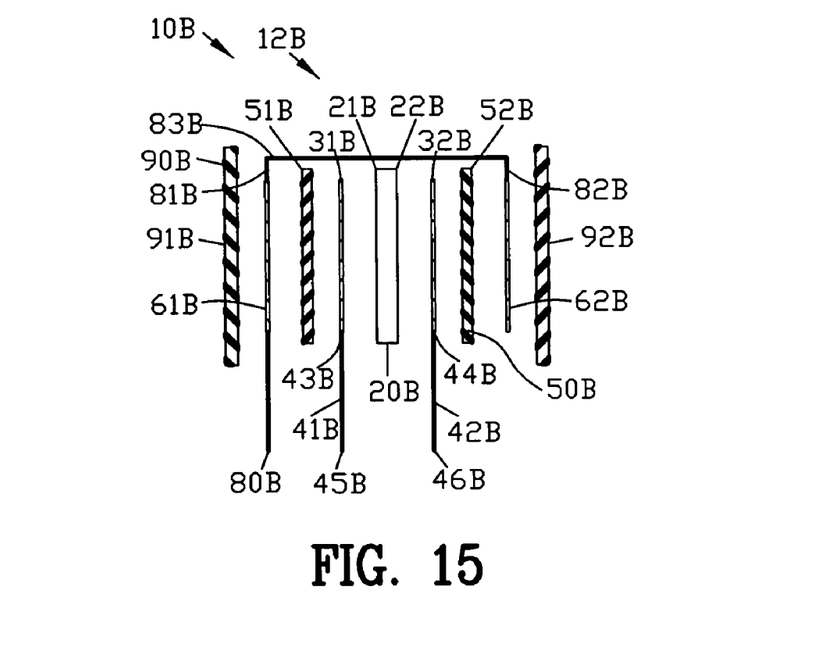
FIG. 15 is an enlarged exploded view of the second embodiment of the fault sensor shown in FIGS. 13 and 14.

FIGS. 13-15 are various views of a third embodiment of a fault detector sensor 10B for detecting the failure of a surge suppression device 12B shown as a metal oxide varistor (MOV). The fault detector sensor 10B shown in FIGS. 13-15 illustrates the incorporation of the fault detector sensor 10B of the present invention into the surge suppression device 12B during the manufacturing thereof. The fault detector sensor 10B is designed to operate in concert with a disconnect circuit shown in FIGS. 16-20.

FIG. 15 is an enlarged sectional exploded view of the third embodiment of the fault detector sensor 10B shown in FIGS. 13 and 14. The surge suppression device 12B comprises a surge suppression material 20B having a first side 21B and a second side 22B with a first and a second surge suppression electrode 31B and 32B located on the first and second sides 21B and 22B of the surge suppression material 20B.

A first and a second surge suppression connector 41B and 42B comprise inner portions 43B and 44B and outer portions 45B and 46B. The inner portions 43B and 44B are in contact with the first and second surge suppression electrodes 31B and 32B. A surge suppression insulating material 50B shown as a first and a second surge suppression insulating material 51B and 52B overlaying the first and second surge suppression electrodes 31B and 32B.

The fault detector sensor 10B comprises a fault sensor conductive layer 60B shown as a first and a second metallic coating 61B and 62B overlying the first and second surge suppression insulating materials 51B and 52B. The first and second metallic coating 61B and 62B are applied to the first and second surge suppression insulating materials 51B and 52B by various types of coating processes such as the coating process set forth in FIGS. 9-12. In the alternative, the fault sensor conductive layer 60B may comprise a metallic foil as described with reference to FIGS. 1-8.

A fault sensor wire 80B comprises a first and a second inner wire portion 81B and 82B connected by a wire bend 83B. The fault sensor wire 80B has an outer wire portion 85B. The first and second wire portions 81B and 82B are connected to the first and second metallic coating 61B and 62B. The first and second wire portions 81B and 82B are connected to the first and second metallic coating 61B and 62B suitable means.

An outer insulator 90B overlays the surge suppression material 20B, the first and second surge suppression electrodes 31B and 32B, the first and second surge suppression insulating materials 51B and 52B and the first and second metallic coatings 61B and 62B. The outer insulator 90A overlays the inner portions 43A and 44A of the first and second surge suppression connectors 41B and 42B as well as the first and second wire portions 81B and 82B. The outer portions 45B and 46B of the first and second surge suppression connectors 41B and 42B as well as the outer wire portion 85B of the fault sensor wire 80B extend from the outer insulator 90B for connection to an external circuit as shown in FIGS. 16-20.

Figure 16:
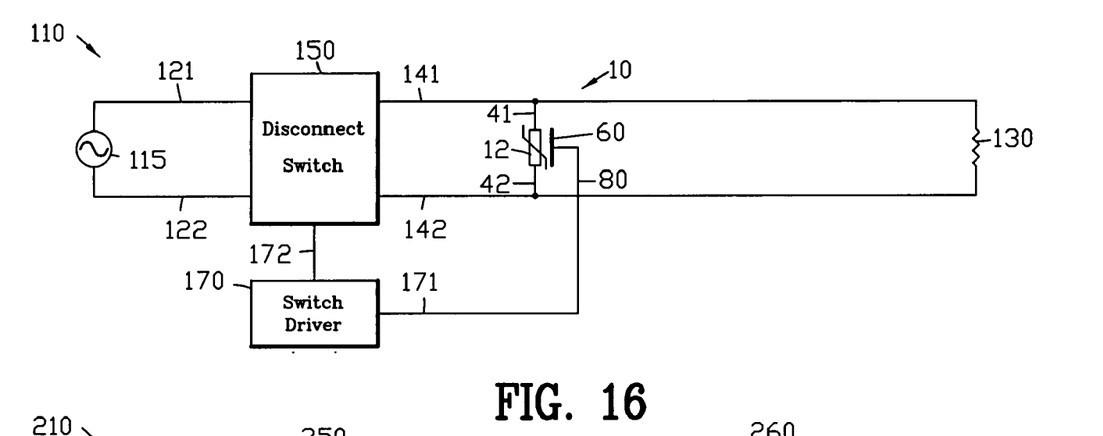
FIG. 16 is a first circuit diagram for disconnecting electrical power upon the fault sensor of the present invention detecting a failure of a surge suppression device.

FIG. 16 is a circuit diagram of a first embodiment of the circuit 110 connecting an electrical power source 115 to a load 130. The electrical power source 115 is connected to the load by connectors 121 and 122 and conductors 141 and 142 to the load 130. A disconnect switch 150 is interposed between the connectors 121 and 122 and the conductors 141 and 142. The disconnect switch 150 is normally in the closed position.

The circuit 110 incorporates any of the three embodiments of the fault detector sensor 10 of the present invention shown in FIGS. 1-15. The first and second surge suppression connector 41 and 42 of the surge suppression device 12 are connected to conductors 141 and 142. The fault sensor wire 80 of the fault detector sensor 10 is connected to a switch driver 170 by a connector 171. The switch driver 170 is connected to the disconnect switch 150 by a connector 172. The switch driver 170 controls the opening of the disconnect switch 150.

When the connectors 121 and 122 are connected to the electrical power source 115, electrical power is delivered to the load 130 through the disconnect switch 150 and connectors 141 and 142. The conductors 141 and 142 apply a nominal voltage of the electrical power source 115 across the surge suppression device 12. The nominal voltage applied across the surge suppression device 12 results in a small leakage current flowing through the surge suppression material 20

When a transient high voltage applied across the conductors 141 and 142, the transient high voltage is applies to the surge suppression material 20 of the surge suppression device 12. The transient high voltage results in a large current flow through in the surge suppression material 20 due to the break down or the avalanche effect of the surge suppression material 20. The large current flow through in the surge suppression material 20 passes the transient high voltage between conductors 141 and 142 to protect the load 130 from the transient high voltage. If the voltage and/or the duration of the transient high voltage is within the operational limits of the surge suppression device 12, the surge suppression device 12 is undamaged and returns to normal operation.

If the voltage and/or the duration of the transient high voltage is in great excess of the operational limits of the surge suppression device 12, the surge suppression device 12 may melt, burn, vaporize, or otherwise be damaged or destroyed. For example, a nearby lightning strike may permanently damage the surge suppression device 12. The melting, burning and/or vaporizing of the surge suppression device 12 may cause damage or destruction to adjacent areas especially if the transient high voltage in great excess of the operational limits is not disconnected from the surge suppression device 12 and/or the load 130.

The fault detector sensor 10 of the present invention disconnects the surge suppression device 12 and/or the load 130 in the event of damage or destruction to the surge suppression device 12. If the voltage and/or the duration of the transient high voltage in great excess of the operational limits of the surge suppression device 12, the surge suppression device 12 will initially begin melting, burning or producing a plasma. The melting, burning or plasma of the surge suppression device 12 causes one or both of the first and second metallic coating 61 and 62 of the fault sensor conductive layer 60 to contact with one or more of the first and second surge suppression electrodes 31 and 32. The contact of fault sensor conductive layer 60 with one or more of the first and second surge suppression electrodes 31 and 32 electrically connects the fault sensor wire 80 with one or more of the first and second surge suppression connectors 41 and 42 to produce a fault current in the fault sensor wire 80.

The fault current in the fault sensor wire 80 is applied to the switch driver 170 for opening the disconnect switch 150 for disconnecting electrical power from the electrical power source 115 to the surge suppression device 12 and to the load 130.

In this embodiment, the disconnect switch 150 and the switch driver 170 are shown as a dedicated disconnect circuit for disconnecting electrical power from the electrical power source 115 upon the upon a current flowing in the fault sensor wire 80. However, it should be understood that the disconnect circuit may have a multiple purpose as will be described with reference to FIGS. 13-18.

Figure 17:
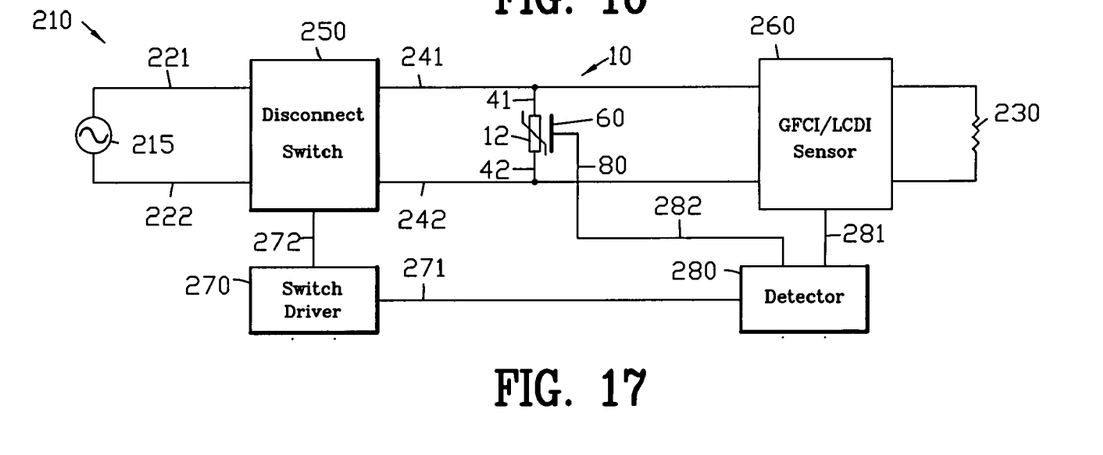
FIG. 17 is a second circuit diagram for disconnecting electrical power upon the fault sensor of the present invention detecting a failure of a surge suppression device.

FIG. 17 is a circuit diagram of a second embodiment of the circuit 210 connecting an electrical power source 215 to a load 230. The electrical power source 215 is connected to the load by connectors 221 and 222 and conductors 241 and 242 to the load 230. A disconnect switch 250 and a ground fault circuit interrupter (GFCI) and/or a leakage current detector interrupter (LCDI) sensor 260 are interposed between the electrical power source 215 and the load 230. The disconnect switch 250 is normally in the closed position.

A conductor 281 connects the (GFCI/LCDI) sensor 260 to a detector 280. A conductor 2711 interconnects the detector 280 to a switch driver 270. The switch driver 270 is connected to the disconnect switch 250 by a connector 272 for controlling the opening of the disconnect switch 250.

The circuit 210 incorporates any of the three embodiments of the fault detector sensor 10 of the present invention shown in FIGS. 1-15. The first and second surge suppression connectors 41 and 42 of the surge suppression device 12 are connected to the conductors 241 and 242. A conductor 282 connects the fault sensor wire 80 of the fault detector sensor 10 to the detector 280.

When the connectors 221 and 222 are connected to the electrical power source 215, electrical power is delivered to the load 230 through the disconnect switch 250 and the (GFCI/LCDI) sensor 260. The conductors 241 and 242 apply a nominal voltage of the electrical power source 215 across the surge suppression device 12. The nominal voltage applied across the surge suppression device 12 results in a small leakage current flowing through the surge suppression material 20

In the event the (GFCI/LCDI) sensor 260 detects a ground fault and/or a leakage current in the circuit, the (GFCI/LCDI) sensor 260 provides a signal to the detector 280. The detector 280 provides a signal to the switch driver 270 to open the disconnect switch 250 for disconnecting electrical power from the electrical power source 115 to the load 130.

If a voltage and/or duration of a transient high voltage is in great excess of the operational limits of the surge suppression device 12, the fault detector sensor 10 of the present invention disconnects electrical power from the electrical power source 215 to the load 230. When the voltage and/or the duration of the transient high voltage in great excess of the operational limits of the surge suppression device 12, the surge suppression device 12 will begin melting, burning or producing a plasma. The melting, burning or plasma of the surge suppression device 12 produces a fault current in the fault sensor wire 80 as previously explained.

The fault current in the fault sensor wire 80 is applied to the detector 280. The detector 280 provides a signal to the switch driver 270 to open the disconnect switch 250 for disconnecting electrical power from the electrical power source 115 to the load 130. In this embodiment, the disconnect switch 250 and the switch driver 270 provide a multiple purpose disconnect circuit for disconnecting electrical power from the electrical power source 215 upon the upon a current flowing in the fault sensor wire 80.

Figure 18:
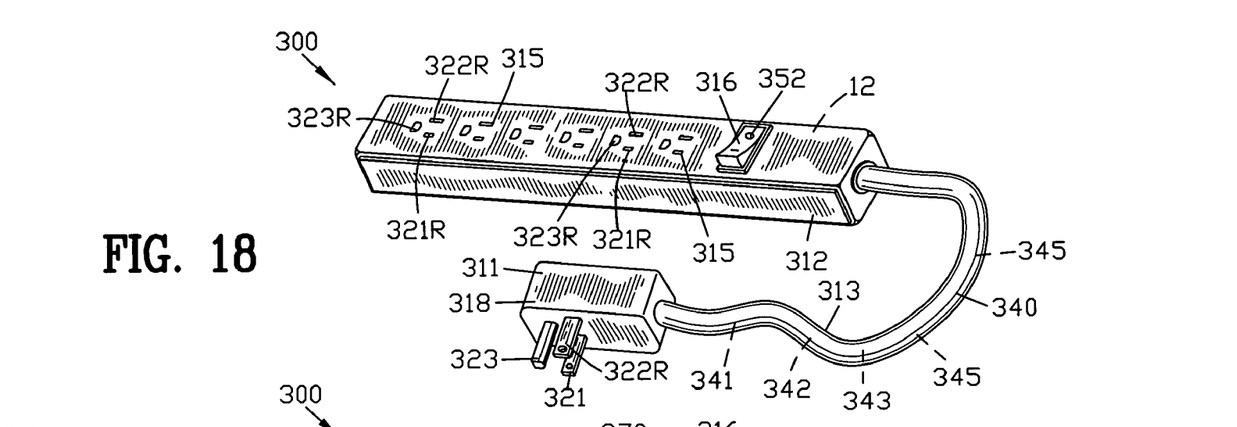
FIG. 18 is an isometric view of an electrical power strip incorporating the present invention.

FIG. 18 is an isometric view of an electrical appliance 300 incorporating the fault detector sensor 10 of the present invention. The electrical appliance 310 comprises an electrical plug 311 and a power strip 312. The electrical plug 311 is connected to the electrical power strip 312 by a power cable 313 for providing electrical power to a plurality of electrical receptacles 315. A power switch 316 is located within the electrical power strip 312 for controlling electrical power to the plurality of electrical receptacles 315.

Figure 19:
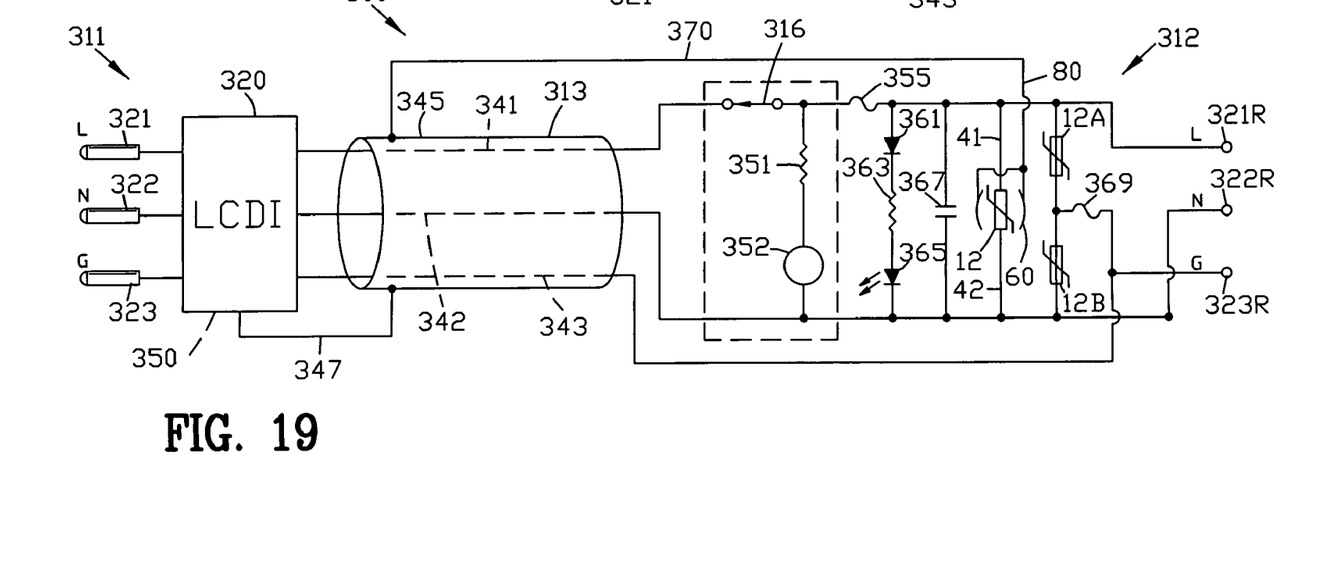
FIG. 19 is a circuit diagram of the electrical power strip of FIG. 18 with the fault sensor of the present invention cooperating with a leakage current detection circuit for disconnecting electrical power upon the fault sensor of the present invention detecting a failure of a surge suppression device.

FIG. 19 is a third circuit diagram of the electrical appliance 300 of FIG. 18 for disconnecting electrical power upon the fault sensor 10 of the present invention detecting a failure of a surge suppression device 12. The electrical plug 311 includes a housing 318 supporting a line plug 321, a neutral plug 322 and a ground plug 323. A leakage current detection circuit (LCDI) 320 is located within the housing 318.

The leakage current detection circuit (LCDI) 320 connects the line plug 321, a neutral plug 322 and a ground plug 323 to a line conductor 341, a neutral conductor 342 and a ground conductor 343 of the power cable 313. A conductive shield 345 surrounds the line conductor 341, a neutral conductor 342 and a ground conductor 343. A conductor 347 interconnects the conductive shield 345 to the leakage current detection circuit (LCDI) 320.

The leakage current detection circuit (LCDI) 320 disconnects electrical power to the power cable 313 upon the detection of any leakage current occurring between any of the line conductors 341, the neutral conductors 342 and the ground conductors 343 and the conductive shield 345. A complete explanation of examples of the leakage current detection circuit (LCDI) 320 will be described with reference to FIG. 16.

The line conductor 341 is connected to power switch 316 is located within the electrical power strip 312. A current limiting resistor 351 and a neon lamp 352 are connected across the line conductors 341 and the neutral plug 322. The neon lamp 352 indicates the closing of power switch 316 and the presence of electrical voltage to the plurality of electrical receptacles 315.

A fuse 355 connects the power switch 316 to a diode 361 a current limiting resistor 363 and a light emitting diode (LED) 365. The light emitting diode (LED) 365 indicates the presence of electrical voltage passed the fuse 355. A capacitor 367 provides a shunt for high frequency noise in the electrical power source.

A surge suppression device 12 is connected across the line conductors 341 and the neutral conductors 342. The first and second surge suppression connector 41 and 42 of the surge suppression device 12 are connected to the conductors 341 and 342. A conductor 370 connects the fault sensor wire 80 to the conductive shield 345.

Surge suppression devices 12B and 12C are connected between the line conductors 341 and the neutral conductors 342 to the ground conductors 343 through a fuse 369. The line conductor 341, the neutral conductor 342 and the ground conductor 343 are connected to a line socket 321R, a neutral socket 322R and a ground socket 323R for each of plurality of electrical receptacles 315. Although the surge suppression devices 12B and 12C are not provided with a fault detector sensor 10, it should be understood that the surge suppression devices 12B and 12C maybe provided with a fault detector sensor 10 connected to the conductive shield 345.

The conductors 341 and 342 apply a nominal voltage to the plurality of electrical receptacles 315. The nominal voltage applied across the surge suppression device 12 results in a small leakage current flowing through the surge suppression material 20

When a transient high voltage applied across the conductors 341 and 342, the transient high voltage is applies to the surge suppression material 20 of the surge suppression device 12. If the voltage and/or the duration of the transient high voltage is within the operational limits of the surge suppression device 12, the surge suppression device 12 passes the transient high voltage between the conductors 341 and 342 and the undamaged surge suppression device 12 returns to normal operation.

If the voltage and/or the duration of the transient high voltage in great excess of the operational limits of the surge suppression device 12, the surge suppression device 12 will burn or produce a plasma. One or both of the first and second surge suppression connectors 41 and 42 are connected to the fault sensor wire 80 to provide a fault current in the fault sensor wire 80.

The fault current in the fault sensor wire 80 is applied through the conductor 347 to the leakage current detection circuit (LCDI) 320. The leakage current detection circuit (LCDI) 320 disconnects electrical power from the power cable 313.

The incorporation of the fault detector sensor 10 in a surge suppression device 12 operates in concert with an existing disconnect circuit such as a leakage current detection circuit (LCDI) 320 with the need for additional circuit components. No modification of the leakage current detection circuit (LCDI) 320 is required for the incorporation of the fault detector sensor 10 in a surge suppression device 12. Only the fault sensor wire 80 is required to be connected to the conductive shield 345 power of the cable 313. The fault detector sensor 10 in a surge suppression device 12 extends the usefulness of the leakage current detection circuit (LCDI) 320.

Figure 20:
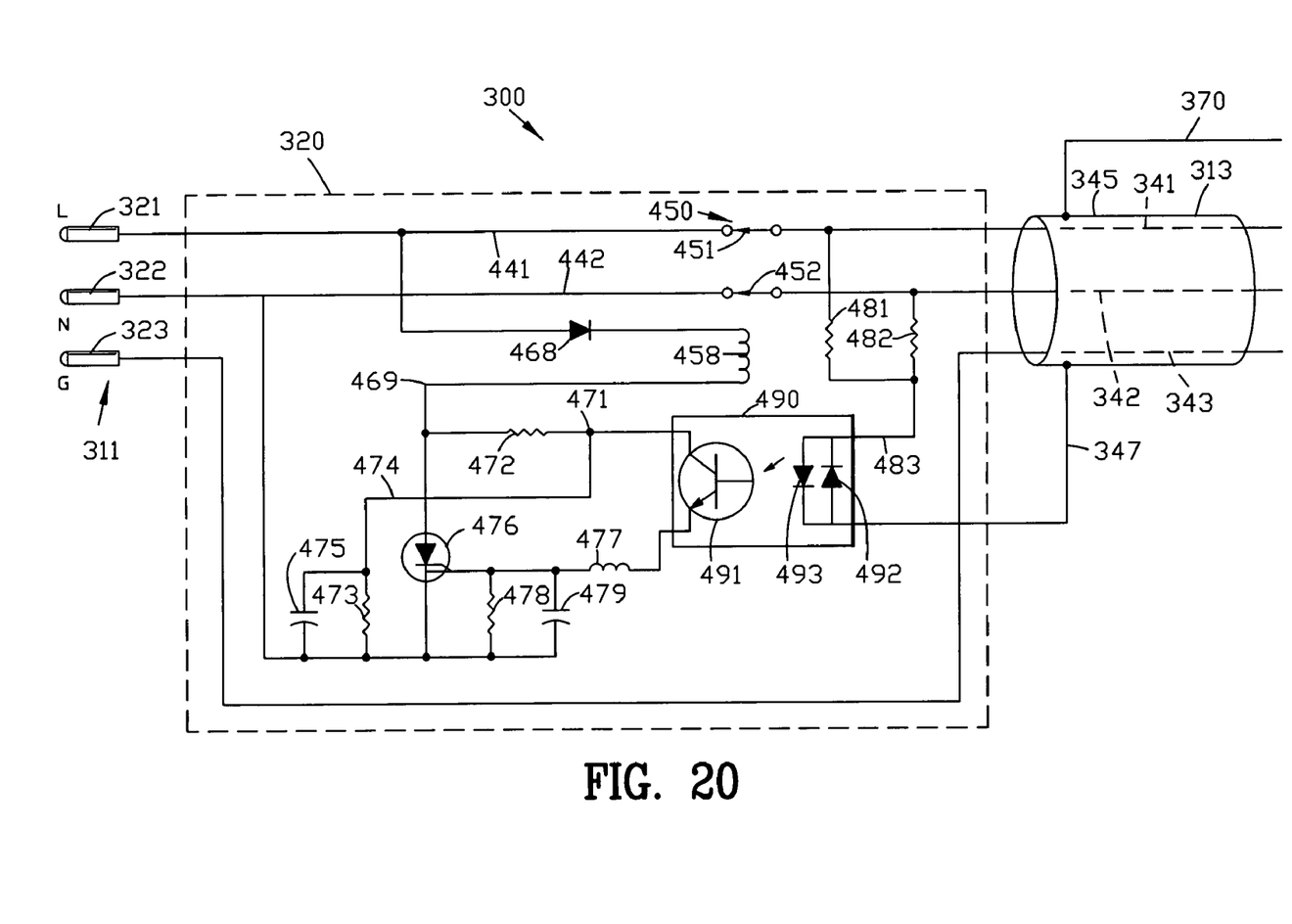
FIG. 20 is an example of a leakage current detection circuit shown in FIG. 19.

FIG. 20 is an example of a leakage current detection circuit 320 shown in FIGS. 14 and 15. The connectors 321 and 322 extending from the housing 318 are connected to an input side of the disconnect switch 450. The output side of the disconnect switch 450 is connected to the conductor 341 and the conductor 342 of the wire assembly 313. A ground wire 423 bypasses the disconnect switch 450 and passes to ground the conductor 343 of the wire assembly 313

The disconnect switch 450 is controlled through the solenoid coil 458. A diode 468 provides power through the solenoid coil 458 of the disconnect switch 450 to a conductor 469. The solenoid coil 458 is connected to a voltage divider network 471 comprising resistor 472 and resistor 473. A capacitor 475 is connected across the resistor 473 of the voltage divider network 471. The conductor 469 is connected to a switch shown as a thyristor or silicon controlled rectifier 476.

The voltage divider network 471 is connected to the collector of the phototransistor 491 of the optocoupler 490. A coil 477 connects the emitter of phototransistor 491 to the gate of the thyristor 476. A pull down resistor 478 and a capacitor 479 are connected to the gate of the thyristor 476.

Resistor 481 and 482 forms a voltage divider network 483. The voltage divider network 483 is connected to light emitting diodes 492 and 493 within an optocoupler 490. A connector 484 connects the light emitting diodes 492 and 493 to a drain wire 444 connected to the shield 445 of the power cable 313.

Upon the application of power, conventional current flows from diode 468 through the solenoid coil 458 to the voltage divider network 471. The diode 468 in combination with solenoid coil 458 provides a direct current (DC) voltage to the voltage divider network 471 and to the anode of the thyristor 476. The capacitor 475 assists in reducing alternating current (AC) voltage ripple within the voltage divider network 471. The voltage divider network 471 provides operating voltage to the collector of phototransistor 491. The total resistance of resistors 472 and 473 of the voltage divider network 471 is selected to establish a minor conventional current flow through the solenoid coil 458. The minor voltage through the solenoid coil 458 is insufficient to actuate the disconnect switch 450.

The voltage divider circuit 483 of the secondary circuit 480 provides operating voltage to the light emitting diodes 492 and 493. The light emitting diodes 492 and 493 transfer voltage through conductor 484 and the drain wire 444 to appear along substantially the total length of the conductive shield 447.

In the absence of a leakage current between the conductive shield 447 and any of the first wire 441, the second wires 442 or the ground wire 443, zero current will flow through the conductive shield 447 and the drain wire 444 through the light emitting diodes 492 and 493. With zero current flowing through the light emitting diodes 492 and 493, will not illuminate the phototransistor 491. The absence of illumination of the phototransistor 491 will keep the gate of the thyristor 476 in a low voltage condition. The pull down resistor 478 and capacitor 479 in combination with the coil 477 prevents inadvertent actuation of the thyristor 476 by electrical transients. As long as thyristor 476 is in a non-conductive condition, the disconnect switch 450 remains in the closed or reset condition.

In the event of a leakage appearing between the conductive shield 447 and any of the first wire 441, the second wire 442 or the ground wire 443, the leakage current will flow through the conductive shield 445 and the drain wire 444 through one of the light emitting diodes 492 and 493. The leakage current will flow through the light emitting diodes 492 and 493 illuminates the phototransistor 491. Upon illumination of the phototransistor 491, phototransistor 491 conducts conventional current from the collector to the emitter. The charge on capacitor 475 flows through phototransistor 491 raising the voltage on the gate of the thyristor 476 to institute conduction of the thyristor 476. The conduction of the thyristor 476 results in a major conventional current flow through the solenoid coil 458. The major conventional current flow through the solenoid coil 458 actuates the plunger 459 to open the disconnect switch 450. The opening of the circuit breaker 450 disconnects the AC power to the power cable 440 and the load 430. The opening of the disconnect switch 450 completely isolates the power source 415 from the load 430. The optical coupling between the phototransistor 491 and the light emitting diodes 492 and 493 completely electrically isolates the primary circuit 470 from the secondary circuit 480.

Referring back to FIG. 19, if the voltage and/or the duration of a transient high voltage in great excess of the operational limits of the surge suppression device 12, the surge suppression device 12 will burn or produce a plasma. One or both of the first and second surge suppression connectors 41A and 42A are connected to the fault sensor wire 80A to provide a fault current in the fault sensor wire 80A.

Referring again to FIG. 20, the fault current in the fault sensor wire 80A is applied through the conductor 347, the conductive shield 445 and the drain wire 444 to one of the light emitting diodes 492 and 493. The fault current will flow through the light emitting diodes 492 and 493 illuminates the phototransistor 491. Upon illumination of the phototransistor 491, phototransistor 491 conducts conventional current from the collector to the emitter. The charge on capacitor 475 flows through phototransistor 491 raising the voltage on the gate of the thyristor 476 to institute conduction of the thyristor 476. The conduction of the thyristor 476 results in a major conventional current flow through the solenoid coil 458. The major conventional current flow through the solenoid coil 458 actuates the plunger 459 to open the disconnect switch 450. The opening of the circuit breaker 450 disconnects the AC power to the power cable 413 and the surge suppression device 12.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A fault detector sensor for detecting the failure of a surge suppression device, the surge suppression device comprising a surge suppression material interposed between a first and a second surge suppression electrode and surrounded by a surge suppression insulating material with inner portions of a first and a second surge suppression connector being in contact with the first and second surge suppression electrode and with outer portions of the first and second surge suppression connectors extending outwardly from the surge suppression insulating material, the fault sensor circuit comprising:
   a fault sensor conductive layer overlaying at least a portion of the surge suppression insulating material of the surge suppression device; and
   a fault sensor connector connected to said fault sensor conductive layer for conducting a fault current in said fault sensor connector upon a failure in the surge suppression device.

2. A fault sensor circuit as set forth in claim 1, wherein said fault sensor conductive layer comprises a metallic layer overlaying at least a portion of the surge suppression insulating material of the surge suppression device.

3. A fault sensor circuit as set forth in claim 1, wherein said fault sensor conductive layer comprises a metallized layer overlaying at least a portion of the surge suppression insulating material of the surge suppression device.

4. A fault sensor circuit as set forth in claim 1, wherein said fault sensor conductive layer comprises a metallic foil overlaying at least a portion of the surge suppression insulating material of the surge suppression device.

5. A fault sensor circuit as set forth in claim 1, wherein the surge suppression device defines a first and a second side; and
   said fault sensor conductive layer comprising a first and a second foil overlaying at least a portion of the first and second sides of the surge suppression device.

6. A fault sensor circuit as set forth in claim 1, wherein said fault sensor conductive layer comprises a metallic foil affixed to at least a portion of the surge suppression device with an adhesive.

7. A fault sensor circuit as set forth in claim 1, wherein said fault sensor connector comprises a metallic wire engaging with said fault sensor conductive layer.

8. A fault sensor circuit as set forth in claim 1, wherein said fault sensor connector comprises a metallic wire underlying said conductive layer.

9. A fault sensor circuit as set forth in claim 1, wherein the surge suppression device defines a first and a second side; and
   said fault sensor conductive layer comprising a first and a second fault sensor conductive layer overlaying the first and the second side of the surge suppression device; and
   said fault sensor connector comprising a metallic wire contacting said first and second fault sensor conductive layers.

10. A fault sensor circuit as set forth in claim 1, including an outer insulator overlaying said fault sensor conductive layer and overlaying an inner portion of said fault sensor connector with an outer portion of said fault sensor connector extending outwardly from said outer insulator.

11. A fault detector sensor for detecting the failure of a surge suppression device, the surge suppression device comprising a surge suppression material interposed between a first and a second surge suppression electrode and surrounded by a surge suppression insulating material with an inner portion of a first and a second surge suppression connector being in contact with the first and second surge suppression electrode and with an outer portion of the first and second surge suppression connectors extending outwardly from the surge suppression insulating material, the fault sensor circuit comprising:
   a fault sensor conductive layer overlaying at least a portion of the surge suppression insulating material of the surge suppression device;
   a fault sensor connector connected to said fault sensor conductive layer for conducting a fault current in said fault sensor connector upon a failure in the surge suppression device; and
   a disconnect circuit connected to said fault sensor connector for disconnecting electrical power to the surge suppression device upon the detection of a current in said fault sensor connector.

12. A fault sensor circuit as set forth in claim 11, wherein the surge suppression device comprises a metal oxide varistor (MOV).

13. A fault sensor circuit as set forth in claim 11, wherein the surge suppression device defines a first and a second side;
   said fault sensor conductive layer comprising a first and a second foil overlaying at least a portion of the first and second sides of the surge suppression device; and
   a first and a second adhesive for affixing said first and second foils to said first and second sides of the surge suppression device.

14. A fault sensor circuit as set forth in claim 11, wherein said fault sensor connector comprises a metallic wire underlying said fault sensor conductive layer.

15. A fault sensor circuit as set forth in claim 11, wherein the surge suppression device defines a first and a second side; and
   said fault sensor conductive layer comprising a first and a second fault sensor conductive layer overlaying the first and the second side of the surge suppression device; and
   said fault sensor connector comprising a metallic wire contacting said first and second fault sensor conductive layers.

16. A fault sensor circuit as set forth in claim 11, wherein the surge suppression device defines a first and a second side;
   said fault sensor conductive layer comprising a first and a second fault sensor conductive layer overlying at least a portion of the first and second sides of the surge suppression device; and
   an outer insulator located adjacent to the first and second sides the surge suppression device for overlaying said first and second fault sensor conductive layers and for overlaying an inner portion of said fault sensor connector with an outer portion of said fault sensor connector extending outwardly from said outer insulator.

17. A fault sensor circuit as set forth in claim 11, wherein said disconnect switch disconnects electrical power to the surge suppression device upon the detection of a breakdown in the surge suppression insulating material.

18. A fault sensor circuit as set forth in claim 11, wherein said disconnect switch connects electrical power to the surge suppression device; and
   said disconnect switch having a disconnect switch driver for controlling said disconnect switch; and said fault sensor connector connected to said disconnect switch driver for disconnecting electrical power to the surge suppression device upon a current flowing in said fault sensor connector.

19. A surge suppression device with an integral fault detector sensor, comprising:
- a surge suppression material interposed between a first and a second surge suppression electrode;
- a first and a second surge suppression connector connected to said first and second surge suppression electrode;
- a surge suppression insulating material overlaying said first and second surge suppression electrodes;
- a fault sensor conductive layer overlaying at least a portion of said surge suppression insulating material;
- a fault sensor connector connecting to said fault sensor conductive layer; and
- an outer insulating material surrounding said fault sensor conductive layer and said surge suppression insulating material and said first and second surge suppression electrodes and said surge suppression material and overlaying an inner portion of said first and second surge suppression connector and overlaying an inner portion of said fault sensor connector with an outer portion of said first and second surge suppression connector and an outer portion of said fault sensor connector extending outwardly from said outer insulator.

20. The process of installing a fault detector sensor to a conventionally manufactured surge suppression device, the conventional surge suppression device, the conventionally manufactured surge suppression device having a disk shape defining a first and a second generally circular side of the conventionally manufactured surge suppression device; the conventional surge suppression device having a first and a second surge suppression connector extending from the disk shape conventionally manufactured surge suppression device, the process comprising the steps of:
- applying a fault sensor conductive layer with a fault sensor connector to at least one of the first and second generally circular sides of the conventionally manufactured surge suppression device; and
- overlaying the fault sensor conductive layer with an outer insulating material.

* * * * *